(12) United States Patent
Bruggink et al.

(10) Patent No.: US 11,071,278 B2
(45) Date of Patent: Jul. 27, 2021

(54) APPARATUS AND METHOD FOR FEEDING AN ANIMAL

(71) Applicant: HAYGAIN LTD, Lambourn (GB)

(72) Inventors: Anne-Jan Bruggink, Lambourn (GB); Rebecca James, Lambourn (GB)

(73) Assignee: HAYGAIN LTD., Lambourn (GB)

( * ) Notice: Subject to any disclaimer, the term of this patent is extended or adjusted under 35 U.S.C. 154(b) by 197 days.

(21) Appl. No.: 16/317,949

(22) PCT Filed: Jul. 14, 2017

(86) PCT No.: PCT/GB2017/052080
§ 371 (c)(1),
(2) Date: Jan. 15, 2019

(87) PCT Pub. No.: WO2018/011595
PCT Pub. Date: Jan. 18, 2018

(65) Prior Publication Data
US 2019/0281787 A1    Sep. 19, 2019

(30) Foreign Application Priority Data
Jul. 15, 2016 (GB) ..................................... 1612318

(51) Int. Cl.
*A01K 5/01*         (2006.01)
(52) U.S. Cl.
CPC ..................................... *A01K 5/01* (2013.01)
(58) Field of Classification Search
CPC ...... A01K 5/01; A01K 5/0114; A01K 5/0135; A01K 5/0128; A01K 7/00; A47G 19/2211
(Continued)

(56) References Cited

U.S. PATENT DOCUMENTS

| 387,821 | A | * | 8/1888 | Smith | .................... | A01K 5/008 |
| | | | | | | 119/65 |
| 564,788 | A | * | 7/1896 | Hermany et al. | ........ | A01K 1/10 |
| | | | | | | 119/60 |

(Continued)

FOREIGN PATENT DOCUMENTS

| FR | 2722647 A1 | 1/1996 |
| FR | 2852197 A1 | 9/2004 |

(Continued)

OTHER PUBLICATIONS

International Preliminary Report on Patentability, issued in corresponding International Application No. PCT/GB2017/052080, dated Jan. 15, 2019, 12 pages.

(Continued)

*Primary Examiner* — Yvonne R Abbott-Lewis
(74) *Attorney, Agent, or Firm* — Rothwell, Figg, Ernst & Manbeck, P.C.

(57) ABSTRACT

A feeding apparatus includes a container for, in use, containing food for an animal. The container has a side wall through which a slot is defined, the slot extending between closed upper and lower ends of the slot. In use, a feeding restrictor rests on top of the food in the container. A retaining element is positioned outside the container and is movably engageable with an outer portion or surface of the container side wall. The feeding restrictor is coupled to the retaining element before the animal starts to feed, and moves downwardly, guided by the slot, as the animal eats the food. The feeding restrictor can then be uncoupled from the retaining element after the food is eaten, and withdrawn from the container to allow further food to be placed in the container.

18 Claims, 8 Drawing Sheets

(58) Field of Classification Search
USPC .......... 119/61.5, 60, 61.1, 61.2, 51.5, 61.54, 119/51.01, 57, 57.91, 58, 61.3, 61.55, 65; D30/129, 121
See application file for complete search history.

(56) References Cited

U.S. PATENT DOCUMENTS

| | | |
|---|---|---|
| 2,794,473 A | 6/1957 | Williams |
| 3,040,897 A | 6/1962 | Holman |
| 3,589,340 A | 6/1971 | Bellies |
| 5,887,544 A | 3/1999 | Popelier |
| 5,971,202 A | 10/1999 | Filbrun |
| 6,431,117 B1 | 8/2002 | Rauch |
| 7,753,000 B1 | 7/2010 | Turner |
| 8,082,882 B1 | 12/2011 | Tharp |
| 8,342,128 B2 | 1/2013 | Rocker |
| 8,381,684 B2 | 2/2013 | Crawford |
| 8,651,055 B2 | 2/2014 | Dreger et al. |
| 8,887,665 B2 | 11/2014 | Rocker et al. |
| D762,017 S | 7/2016 | Tsengas |
| D821,039 S | 6/2018 | Owens, III |
| 2012/0090549 A1 | 4/2012 | Tharp |
| 2015/0359190 A1 | 12/2015 | Chylinski |
| 2016/0007562 A1* | 1/2016 | Johnson ................ A01K 5/01 119/60 |
| 2016/0374312 A1 | 12/2016 | Tharp |
| 2017/0215374 A1* | 8/2017 | Oliver ................ A01K 5/01 |

FOREIGN PATENT DOCUMENTS

| | | |
|---|---|---|
| GB | 2510110 A | 7/2014 |
| GB | 2528916 A | 2/2016 |
| WO | 2016020666 A1 | 2/2016 |

OTHER PUBLICATIONS

International Search Report and the Written Opinion of the International Searching Authority, issued in corresponding International Application No. PCT/GB2015/052251, dated Oct. 22, 2015, 10 pages.

International Search Report and the Written Opinion of the International Searching Authority, issued in corresponding International Application No. PCT/GB2017/052080, dated Dec. 11, 2017, 17 pages.

Intellectual Property Office Great Britain Search Report, issued in corresponding Great Britain Application No. GB1612318.4, dated Nov. 10, 2017, 1 page.

* cited by examiner

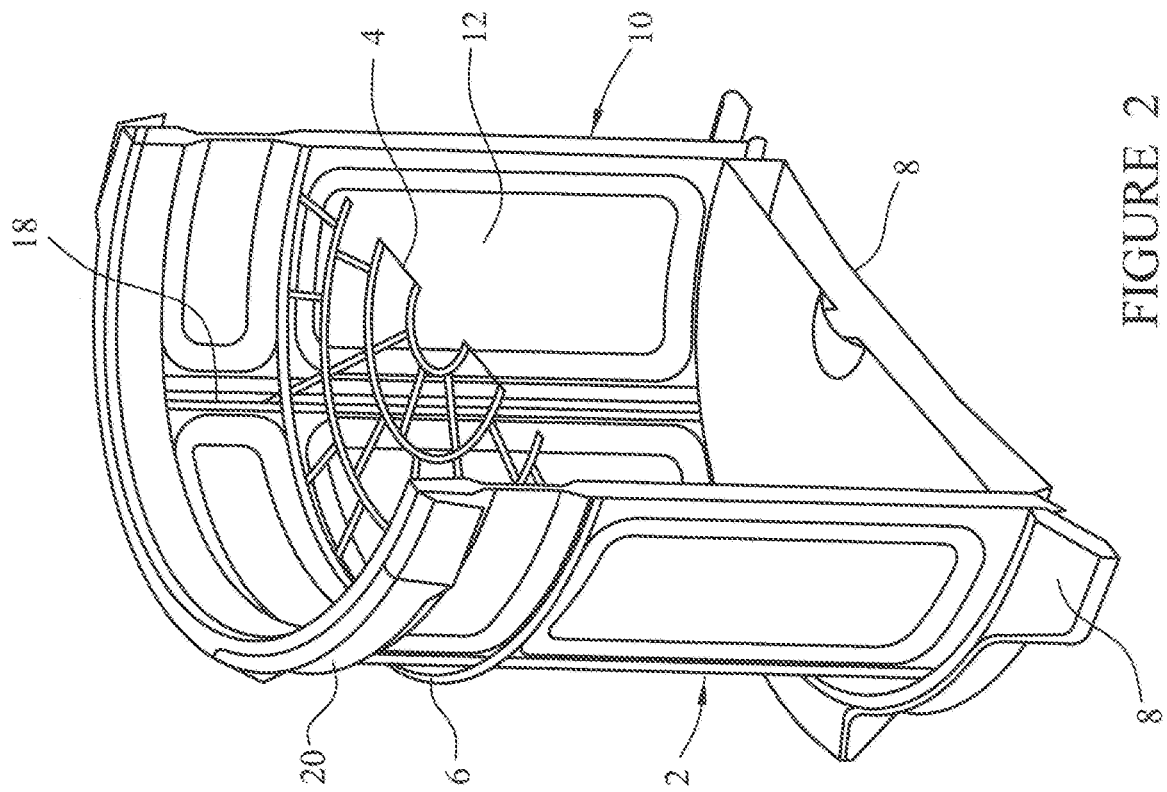
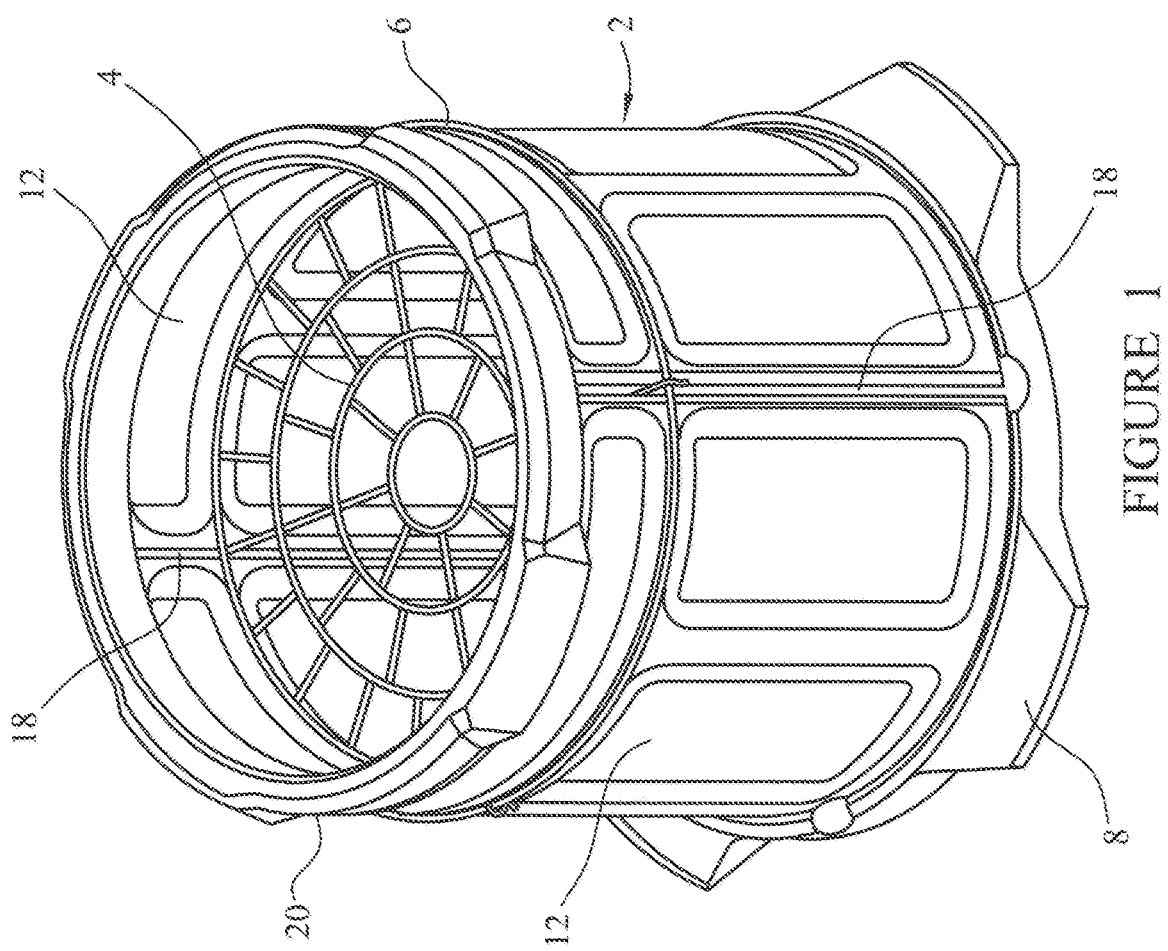

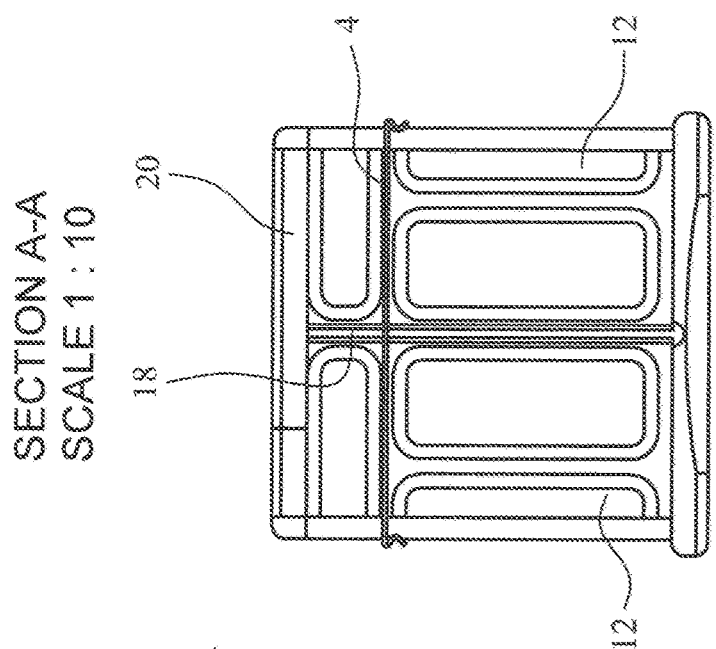
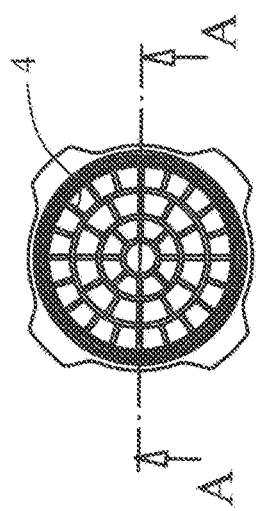
FIGURE 4
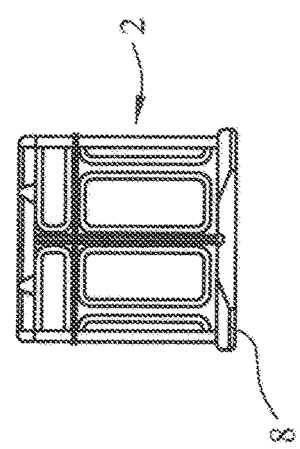
FIGURE 5
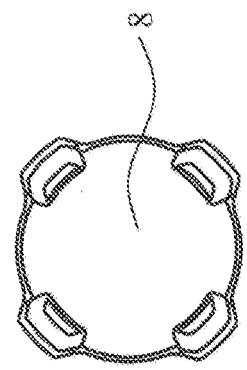
FIGURE 6
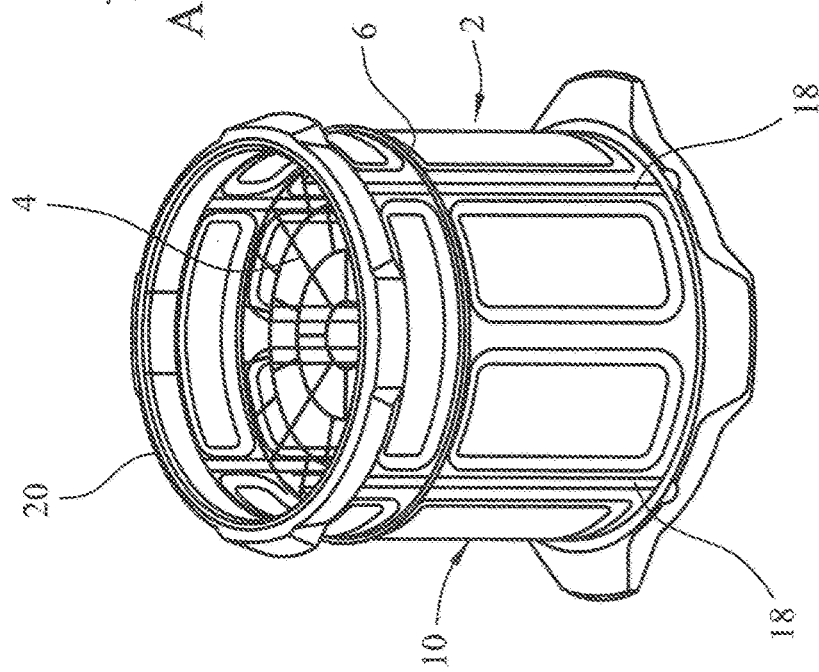
FIGURE 3

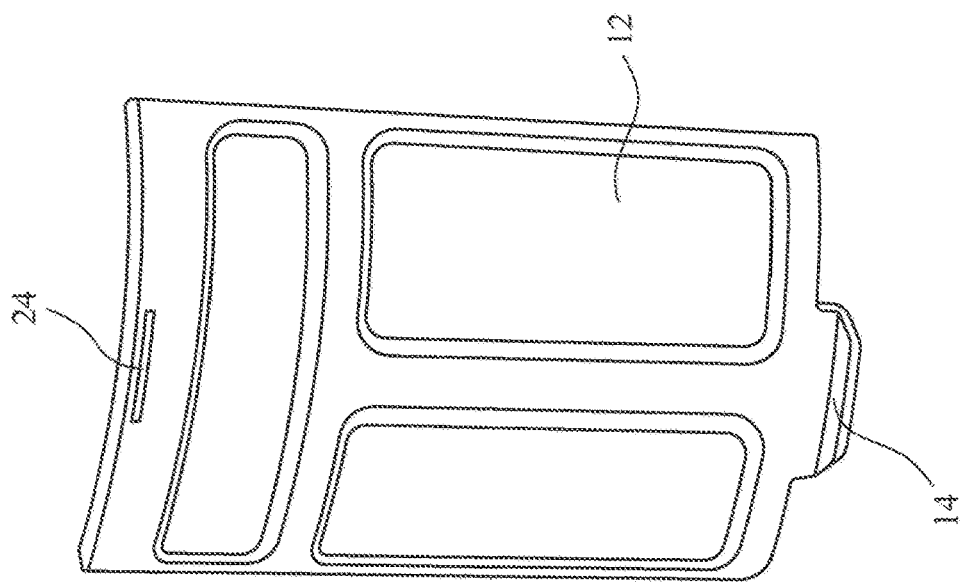
FIGURE 9
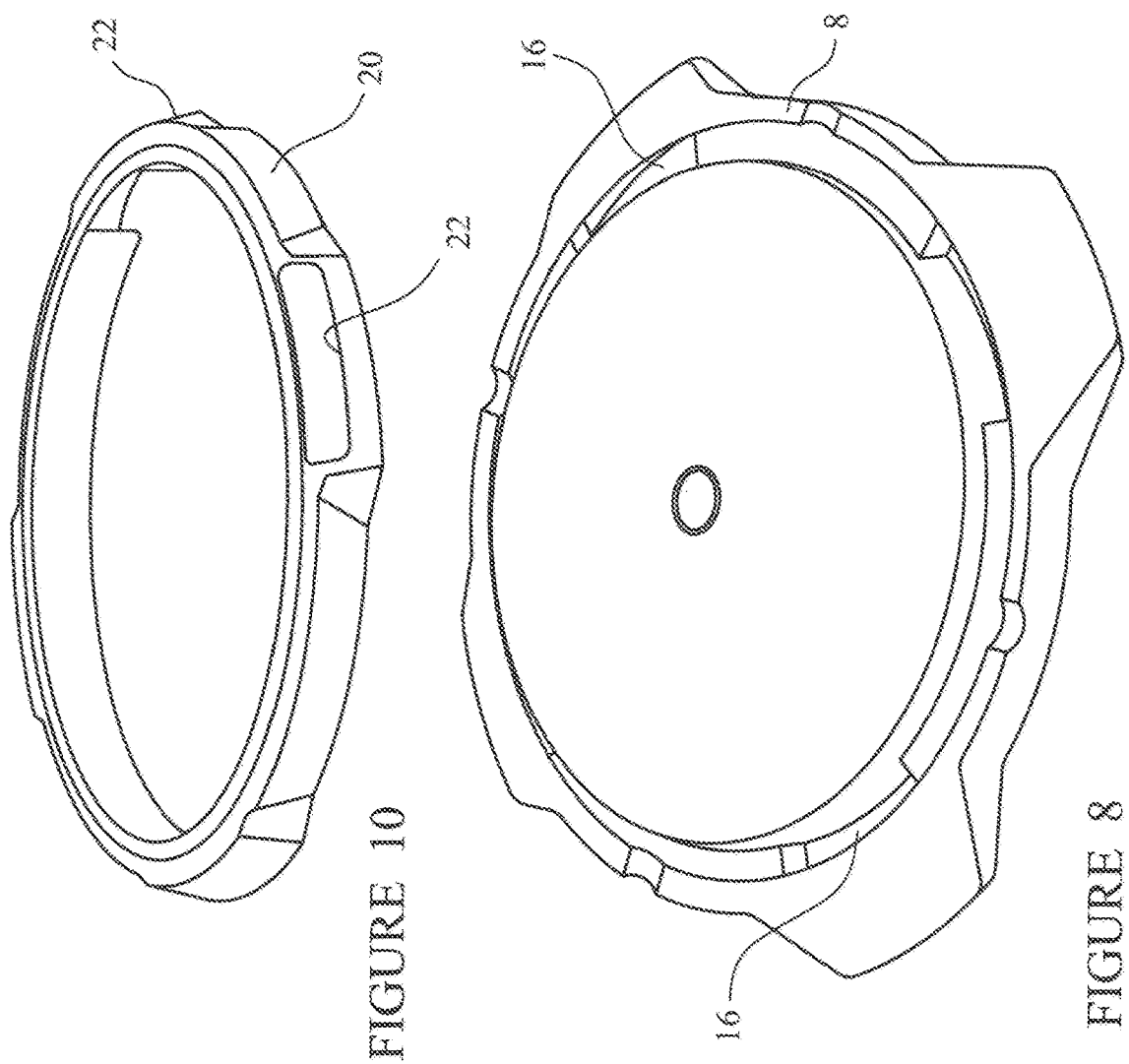
FIGURE 10
FIGURE 8

APPARATUS AND METHOD FOR FEEDING AN ANIMAL

CROSS REFERENCE TO RELATED APPLICATION(S)

This application is a 35 U.S.C. § 371 National Phase Entry Application from PCT/GB2017/052080, filed Jul. 14, 2017, designating the United States, which claims priority upon Great Britain Patent Application No. 1612318.4, filed Jul. 15, 2016. The disclosures of each of the above-referenced applications are herein incorporated by reference in their entirety.

The invention relates to an apparatus and method for feeding an animal, and in particular to a slow-feeding apparatus and method for feeding an animal, such as a horse.

Horses are commonly fed loose forage, such as hay, haylage, other derivatives of hay, straw, or mixed forage, either directly off the ground, from hay nets or from hay racks. Most stabled horses tend to eat their food rapidly, and then spend time inactive in their stable. This does not reflect the natural grazing behaviour of a horse and can cause serious digestive, metabolic and behavioural problems. Similar problems may arise for other types of animal.

A slow feeder is an apparatus for reducing the rate at which an animal feeds, to reflect more closely the natural feeding pattern of the animal and so to avoid health problems which arise when an animal feeds too rapidly.

A conventional slow feeder comprises a container for forage, such as hay, with an open upper end. A feeding restrictor rests on top of the forage in the container. Openings are defined through the restrictor, such that the animal can access the forage through the openings. Typically, the restrictor is in the form of a planar, or flat, grid, grate, mesh or net.

As an animal consumes the forage through the holes in the restrictor, the volume of forage in the container reduces and the restrictor continues to rest on top of the forage, moving downwardly within the container.

Various approaches to the design of slow feeders have been used, but problems have arisen with all such designs to date. In fact, as found in the inventors' tests of existing slow feeders, many such feeders do not even restrict the rate at which an animal consumes fodder by comparison with eating the same fodder from an open container, and so cannot even be considered to be slow feeders.

In conventional slow feeder designs, one common problem is that the restrictor may fail to move freely downwards within the slow-feeder container as the forage is consumed. For example, the restrictor may jam, or get stuck, at an intermediate point before all of the forage is consumed. This is a problem because, if and when the restrictor jams, the animal is prevented from eating further forage. This problem is often caused if an animal feeds from only one side of the container, so that the restrictor tilts within the container.

At the same time it is important to secure the feeding restrictor of a slow feeder so that it is retained in the container and cannot be lifted out by the feeding animal.

In the prior art, attempts have been made to secure slow-feeder restrictors so that they are safely retained within the container but still reliably move downwards as the forage is consumed. For example, in a conventional slow feeder one or more fixed, vertical, guide bars or rods may be positioned in the container and pass through openings in the restrictor, in order to retain the restrictor while allowing it to move downwards. But the problem remains that the restrictor tends to tilt and jam in place against the guide bar(s), or may be blocked by forage caught between the guide bar(s) and the restrictor, before all of the forage is eaten.

Published patent application WO2016/020666A1 describes a slow feeder which addresses these problems. This slow feeder includes a container for holding animal food. One or more vertical slots extend downwardly from an upper edge of a side wall of the container, and extend through the side wall. A welded wire feeding restrictor comprises a grid which rests on top of the food, rods extending outwardly from the food-covering element through the vertical slots, and a retaining ring which extends around the outside of the container. The ring is able to slide freely upwards and downwards outside the container so that the feeding restrictor remains resting on the food. The sliding contact, or engagement, of the retaining ring with the outer surface of the container wall prevents the restrictor from tilting and jamming within the container as the animal eats the food, even if the animal only eats from one side of the container.

This slow feeder design solves the problem of the feeding restrictor tilting and jamming, but a further problem arises. This is because it must be possible to lift the feeding restrictor out of the slots to allow more food to be loaded into the container. If the upper ends of the slots were left open, then the feeding restrictor could be removed but it could also be lifted out of the container by an animal during feeding. In WO2016/020666A1 this problem is addressed by providing a removable annular rim which clips onto the upper edge of the container wall and covers the upper ends of the slots. To refill the container, the rim is removed, the feeding restrictor is lifted out of the slots, and food placed in the container. The feeding restrictor is then lowered back into the slots and the rim clipped back into place. This is a disadvantageously inconvenient process, and when the rim is removed the side wall segments of the container are unsupported at their upper ends, and so are vulnerable to damage.

Further problems arise in the design of slow feeders. For example animals may be prevented from feeding by unfamiliar or disturbing feeding arrangements. This may particularly affect animals such as horses which commonly are nervous. Slow feeders can often cause such problems because eating food through a feeding restrictor is not a familiar or comfortable arrangement for many animals.

Also, as noted above, conventional slow feeders fail in practice to restrict the rate at which an animal feeds, because the feeding restrictor fails to reduce the rate of consumption of the fodder by comparison to a feeding from an open container with no feeding restrictor. This presents a problem, because the digestive, metabolic and behavioural problems caused by excessively rapid feeding are not prevented.

There is therefore a need for a slow feeder that solves the problems of prior art slow feeders.

SUMMARY OF INVENTION

The invention relates to a feeding apparatus, or slow feeder, and a method for feeding animals as defined in the appended independent claims, to which reference should now be made. Preferred or advantageous features of the invention are set out in dependent subclaims.

A first aspect of the invention may therefore advantageously provide a feeding apparatus, or slow feeder, comprising a container for, in use, containing food for an animal. The container may have a side wall through which one or more slots are defined. The slot(s) preferably extend between closed upper and lower ends of the slot(s), in which case the or each slot may be referred to as a blind-ended slot.

The or each slot extends through the thickness of the side wall. A feeding restrictor rests, in use, on top of the food, and a retaining element is movably engageable with an outer portion of the container, for example abutting or being slidable against an outer surface of the container wall. The feeding restrictor is couplable, or removably couplable, through the slot(s), to the retaining element to form a feeding-restrictor assembly. For example, the feeding restrictor may be removably couplable to the retaining element by means of spring clips or the like.

In a preferred embodiment, the outer portion of the container with which the retaining element is slidably engageable may be an outer surface of the side wall itself. This may simplify construction of the slow feeder by enabling the use of, for example, a plain side wall of a predetermined thickness.

A further aspect of the invention may provide a method for using the feeding apparatus. In the method, food may be placed into the container, and the feeding restrictor placed on top of the food. The feeding restrictor is then coupled, through the slot(s), to the retaining element, for example by means of spring clips or other fasteners. The animal can then be allowed to feed, through the restrictor, such that the feeding restrictor and the retaining element move downwards along the slot(s) as the food is eaten. The presence of the feeding restrictor advantageously reduces the rate at which the animal would otherwise eat the food. After the food has been eaten, the feeding restrictor can be uncoupled from the retaining element and withdrawn from the container, to allow more food conveniently to be placed in the container, or to allow the container to be cleaned.

In each aspect of the invention, the slot is preferably is one of two or more slots defined through the side wall of the container, and the feeding restrictor is particularly preferably, in use, coupled to a retaining element at or through each slot. More than one retaining element may be provided. For example one retaining element might be associated with each slot. Alternatively, the retaining element may comprise a ring, for example matching the shape of the container side wall, extending around the outside of the container and crossing the or each slot.

The two or more slots are preferably spaced around the container, particularly preferably being evenly spaced around the container.

In aspects of the invention the feeding restrictor and the retaining element or elements when coupled together preferably form an assembly which comprises a locating element extending through the or each slot. Preferably, the assembly can move freely up and down the slots, but cannot be removed from the container. In other words, the assembly is captive. The slot or slots are preferably vertically oriented, but could be inclined to the vertical, for example arranged helically around the container. However, if more than one slot is present, the slots should be parallel to each other so that the feeding restrictor assembly can slide along the slots while remaining substantially horizontal.

As an animal eats food through the opening(s) in the feeding restrictor, the feeding restrictor assembly falls downwardly within the container. The engagement, or abutment, of the retaining element against the outer portion of the container advantageously retains the assembly in the container and prevents the assembly from tilting, or tilting excessively in such a way as might cause the assembly to jam and prevent it from falling downwardly as the food is progressively eaten. Thus the restrictor assembly preferably remains in substantially the same orientation, such as horizontal or substantially horizontal, at all times, advantageously tilting by less than 5°, 10°, 15°, or 20° from a predetermined orientation.

In different embodiments of the invention, the coupling between the feeding restrictor and the or each retaining element may be arranged in various ways. In one arrangement, a portion of the feeding restrictor may extend outwardly from the container through the or each slot. The feeding restrictor may then be couplable to the or each retaining element by means of a fastener located outside the container. For example, the feeding restrictor may comprise locating elements such as locating rods which extend outwardly through the slot or slots, and which carry fastening means such as clips at their outer ends. The fastening means may then be fastenable or couplable to the or each retaining element outside the slot or slots. Alternatively, the fastening means may form part of the or each retaining element and be fastenable or couplable to the locating elements of the feeding restrictor.

In another arrangement, the retaining element(s) may not be removable from the feeding restrictor. In this case, the feeding restrictor may comprise locating elements such as locating rods which extend outwardly through the slot or slots, and in which a retaining element is carried at the end of each locating element. The retaining elements may be configurable between two states, one in which the retaining element cannot pass through the associated slot, and therefore functions to retain the locating element in the slot, and another in which the retaining element can pass through the slot. In this case, the feeding restrictor is couplable to the or each retaining element by changing the configuration of the or each retaining element. For example, each retaining element may be rotatable between a position transverse to the slot and a position that is aligned with the slot and in which the retaining element can pass through the slot so that the feeding restrictor can be lifted out of the container.

In another arrangement, a portion of the or each retaining element may extend inwardly through the slot. In this case, the retaining element may be in the form of a ring encircling the container, and locating elements, for example in the form of locating rods, may extend inwardly from the retaining element(s) through the or each slot. The feeding restrictor may then be couplable to the retaining element(s) by means of a fastener or fasteners located inside the container. The or each fastener may be secured to the feeding restrictor and couplable to the retaining element, or vice versa.

In a variant of this arrangement, some or all of the locating elements extending inwardly through each slot may meet at the centre of the container, or may otherwise cross the width of the container, for example like the spokes of a wheel. Alternatively, the locating elements may extend inwardly to some other structure such as a ring linking the locating elements inside the container. The retaining element may thus take the form not only of a ring external to the side wall of the container as described above, but may also comprise structure inside the container. The feeding restrictor may then conveniently be coupled to and supported by the retaining element structure inside the container.

In a further arrangement, the feeding restrictor may be couplable to the retaining element within the or each slot, for example by means of a fastener located, in use, within the slot(s). For example the retaining element may comprise inwardly-extending locating elements, for coupling within the slots to outwardly-extending locating elements of the feeding element.

In a preferred embodiment, whatever the arrangement for coupling the feeding restrictor to the retaining element(s), the feeding restrictor can be removed from the container when it is uncoupled from the retaining element(s). When the feeding restrictor is removed from the container, the retaining element(s) may remain engaged with, or captive to, the container.

It is important that the feeding restrictor assembly is sufficiently heavy to fall downwards as the food is eaten, and not be lifted too easily by the animal. But in embodiments of the invention the feeding restrictor may be removable from the assembly, and should therefore preferably be light in weight and easy to handle. In addition, it may be desirable to be able to replace or exchange the feeding restrictor for at least two reasons. One is that it may suffer wear due to contact with the animal's teeth during use. Another is that different feeding restrictors may be optimal for different foods and/or animals. Therefore, in a further aspect of the invention the retaining element of the assembly is more massive, or heavier, than the feeding restrictor, and is preferably more than 2 times, or 3 times, as massive. This means that the retaining element provides most of the required mass of the assembly, while the feeding restrictor can be advantageously light in weight. For example, the assembly preferably weighs more than 1.5 kg, 2 kg or 2.5 kg, and preferably less than 4 kg or 3.5 kg or 3 kg. Of this total weight, the feeding restrictor may weigh less than 0.75 kg or 0.5 kg. The feeding restrictor should be sufficiently heavy to have adequate strength, and so it may weigh more than 0.2 kg or 0.3 kg, or have a mass of more than 10% or 20% of the mass of the retaining element.

Further aspects of the invention may concern the structure of the container of the feeding apparatus. For example, the side wall of the container may be fabricated in two or more segments, the or each slot being defined between pairs of adjacent side-wall segments. The side wall segments may be secured to a base, and may be linked at their upper ends by a rim secured to the side wall segments.

According to a further aspect of the invention, the inventors have found that the feeding behaviour of animals, and in particular of horses, is strongly impacted by the appearance of the feeding apparatus, or slow feeder. Specifically, it has been found that the feeding apparatus is much more acceptable to a horse if the feeding restrictor is light coloured, preferably white. It should be borne in mind that horses do not see the full range of colour perceived by humans, and may be considered to be somewhat colour blind. Therefore, the reflectivity of the feeding restrictor may be related to the light colouring. In other words, a light-coloured feeding restrictor may be one which reflects more than 50% or 60%, and preferably more than 70% of the incident visible light.

Similarly, in a further aspect of the invention, the upper edge or rim of the container side wall is preferably light coloured, and particularly preferably white, preferably reflecting more than 50% or 60%, and preferably more than 70% of incident visible light.

In a further aspect of the invention, the inventors have realised that prior art slow feeders suffer from problems in relation to restricting the rate at which an animal consumes food. In some cases, the feeding restrictor does not restrict the rate of feeding. In other cases, the feeding restrictor prevents the animal from reaching the food; in other words, food becomes trapped beneath the feeding restrictor such that the animal cannot retrieve it. In such cases the animal may become frustrated because it can still see or smell the food.

Further aspects of the invention therefore provide an improved structure for the feeding restrictor of a slow feeder.

The feeding restrictor preferably has a substantially flat, or planar structure, and openings are defined through the feeding restrictor through which the animal can access the food. The inventors have found that at least 80% of the openings, and preferably all of the openings, should be more than 30 cm$^2$ or 35 cm$^2$ or 40 cm$^2$ and less than 50 cm$^2$ or 55 cm$^2$ in area, and preferably between 43 cm$^2$ and 47 cm$^2$ in area.

In a further aspect of the invention, the inventors have found that in a slow feeder, the openings in the feeding restrictor should comprise more than 45% or 50% and less than 60% or 65% of the total area of the feeding restrictor. This aspect of the invention may advantageously be combined with the aspect described above relating to the areas of the openings.

In a further aspect of the invention, the inventors have found that the aspect ratios of the openings, which for each opening may be defined as the ratio of the longest lateral dimension of the opening to the shortest lateral dimension of the opening, or the width to the length of the opening, should be selected to be more than 1 or 1.5, and less than 4 or 3.5. This may advantageously apply to at least 70% or 80% or 90% of the openings in a feeding restrictor. This aspect of the invention may advantageously be combined with the aspects described above.

In a further aspect of the invention, the inventors have found that it is desirable for the portions of the feeding restrictor between the openings to be sufficiently wide that the animal can feel them as it eats, and can easily distinguish the feeding restrictor from the food. When the food is, for example, hay, then a feeding restrictor made of narrow elements such as wire may feel similar to the hay as it is of comparable dimensions. But at the same time, the inventors have found that it is desirable for the portions of the feeding restrictor between the openings to be sufficiently narrow to avoid food becoming trapped beneath them and inaccessible to the feeding animal. In practice, the inventors have found that the portions of the feeding restrictor (struts) between the openings should be between 0.75 and 2.5 cm, and preferably between 1 and 2 cm, in lateral dimension. Thus, it is preferred that at least 50% or 60% or 70% or 80% of the total length of the struts separating the openings in the feeding restrictor should fall within these width ranges. This aspect of the invention may advantageously be combined with any or all of the aspects above relating to the areas of the openings, or the ratio between the area of the openings and the total area of the feeding restrictor, or the aspect ratios of the openings.

In a preferred embodiment, a feeding restrictor is circular, and the openings comprise a central opening and three concentric circular rows of openings. Such a feeding restrictor is preferably between 40 and 70 cm, and particularly preferably between 50 and 60 cm, in diameter or maximum lateral dimension.

Advantageously, the feeding restrictor may be of a material that is not sufficiently hard, such as metal, to damage an animal's teeth. It is preferred to mould the restrictor from a plastics material.

In each aspect of the invention relating to the structure of the feeding restrictor, the aim of the invention is to provide a slow feeder which restricts the rate at which a horse or other animal eats the food, while allowing the animal to be able to reach the food through the restrictor and so to avoid significant amounts of food becoming trapped beneath the restrictor as the container approaches being empty.

In a slow feeder the food may comprise forage and/or hard feed, such as nuts, oats, rolled oats or barley, composite feeds (including cereal-based and nutrient-dense fibre feeds)

etc. It may comprise a mixture of foods. The restrictor rests on top of the food and is shaped and sized to fit within the container and at least one opening is defined through the restrictor, or food-covering element, through which the animal can access the food. The restrictor is preferably planar, or flat, and may, for example, take the form of a grid, grate, mesh, or net, extending across most or all of an upper surface of the food within the container. The animal should not be able to access the food except through the opening(s) in the restrictor.

The slot or slots through the side wall of the container are preferably narrow enough to retain the food in the container, though a small quantity of food falling out of the container through the slot(s) causes no difficulty.

In a preferred embodiment of the invention, the retaining element encircles or surrounds the container. The outer portion of the container, or the outer surface of the side wall, against which the restrictor engages or abuts, may be of a predetermined shape. For example the container may, in plan view, be in the shape of a circle, a square or rectangle, a regular or irregular polygon, or any other shape. Advantageously, the retaining element is then a ring of the same or similar shape, encircling or surrounding the container. The size of the retaining element is preferably slightly larger than the size of the periphery of the outer portion of the container, for example being spaced from the outer portion by more than 5 mm or 10 mm, and less than 50 mm or 30 mm or 20 mm. The spacing may even be less than 15 mm.

If the container is cylindrical, such that its cross-sectional shape and size is the same at all heights (when oriented for use), then the retaining element may be sized relative to the size of the outer portion of the container at any point. If the size of the container varies with height, for example if it is tapered, then the clearance between the retaining element and the outer portion of the container may be measured at the point of largest cross section of the container within the range of movement of the restrictor.

Forming the retaining element closely encircling or surrounding the outer portion of the container may advantageously prevent the feeding restrictor from tilting excessively during use. The restrictor may then advantageously only adopt a small tilt angle before the retaining element engages with, or abuts, the outer portion of the container and prevents further tilting.

If the shape and size of the retaining element are such that it is positioned close to the outer portion of the container at sufficient points around its length, or circumference, or at sufficient points around an outer periphery of the container, then excessive tilting of the feeding restrictor in any direction may advantageously be prevented.

In the prior art, as described above, guide bars or rods may be fixed inside a slow-feeder container, passing through holes in the feeding restrictor to retain and guide the feeding restrictor. This not only causes the risk that the restrictor would tilt and jam, but also occupies space within the container and makes it hard to clean. By contrast, in preferred embodiments of the present invention the container may contain no fixed structures at all, maximising the volume of food it can contain and making it easy to clean and refill.

The invention may therefore advantageously relate to a feeding apparatus which includes a container for, in use, containing food for an animal. The container has a side wall through which a slot is defined. The slot may extend between closed upper and lower ends of the slot. In use, a feeding restrictor rests on top of the food in the container. A retaining element is positioned outside the container and is movably engageable with an outer portion or surface of the container side wall. The feeding restrictor is coupled to the retaining element before the animal starts to feed, and moves downwardly, guided by the slot, as the animal eats the food. The feeding restrictor can then be uncoupled from the retaining element after the food is eaten, and withdrawn from the container to allow further food to be placed in the container.

DESCRIPTION OF SPECIFIC EMBODIMENTS OF THE INVENTION

Specific embodiments of the invention will now be described by way of example, with reference to the accompanying drawing, in which:

FIG. 1 is a perspective view of a slow feeder according to a first embodiment of the invention;

FIG. 2 is a sectional perspective view of the slow feeder of FIG. 1;

FIGS. 3 to 6 are respectively perspective, top, side and bottom views of the slow feeder of FIG. 1;

FIG. 7 is a section on A-A, as shown in FIG. 4, of the slow feeder of FIG. 1, showing the interior of the feeder;

FIGS. 8 to 10 are perspective views of components of the slow feeder of FIG. 1;

Figure 11:
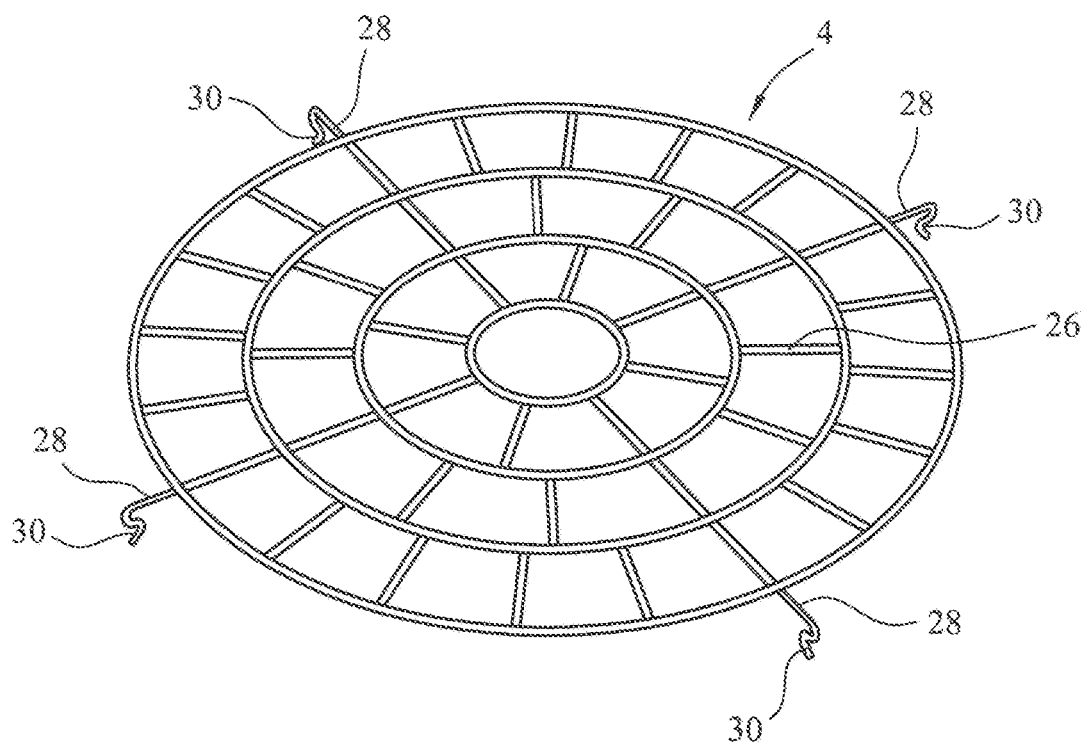
FIG. 11 is a perspective view from above of a feeding restrictor as shown in the slow feeder of FIG. 1.

FIGS. 1 to 7 show views of a slow feeder embodying the invention. The feeder comprises a container 2, a feeding restrictor 4 and a retaining element for the feeding restrictor in the form of a metal ring 6.

The container comprises a base 8 and a side wall 10 in the shape of a circular, upright cylinder. The side wall is formed from four identical curved wall segments 12. The base, wall segments and rim are fabricated from injection-moulded plastic, and are illustrated in FIGS. 8 to 10.

Each wall segment forms a quarter of the circular side wall and comprises a protruding hook 14 at its lower end, which fits securely into a respective corresponding recess 16 in the base. The four wall segments then extend upwardly from the base to form the cylindrical side wall of the slow-feeder container. Slots 18 are defined between the vertical edges of each pair of adjacent wall segments, forming four evenly-spaced, vertical slots at 90° intervals around the periphery of the circular cylindrical container.

An annular upper rim 20 fits over the upper ends of the wall segments, and comprises four resilient hooks 22 which latch with corresponding recesses 24 at the upper end of each wall segment, to provide mechanical support to the side wall and to close the upper ends of the slots. The rim is not removable during normal use of the slow feeder.

The restrictor 4, as illustrated in FIG. 11, is formed of a welded wire structure, or of a robust plastics material, such as POM (polyoxymethylene plastic). It is planar or flat in shape and comprises a circular feed-covering element 26.

The circular periphery of the feed-covering element fits within the circular side wall of the container, with a clearance of approximately 5 mm to 10 mm. In different versions of the slow feeder the diameter of the feed-covering element may be 50 cm or 60 cm, and the internal diameter of the container may be 51 cm or 61 cm, depending on the desired food capacity of the slow feeder.

The restrictor further comprises four locating elements 28 in the form of rods which extend outwardly from the flat feed-covering element, spaced at 90° intervals around the feed-covering element. In use, these locating elements fit within respective slots 18 in the side wall of the container. The outer end of each locating element is in the form of a spring clip, 30, as discussed below.

The retaining ring, or element, 6 encircles the outer surface of the cylindrical side wall. An internal diameter of the retaining element is approximately 10 mm greater than a maximum external diameter of the side wall of the container. As shown in the Figures, the side wall segments are externally shaped to increase the stiffness of the side wall segments while minimising the quantity of material required to make them. The retaining element therefore only engages with, or abuts, the raised portions of the outer surfaces of the side wall segments between the flutes, or grooves. This does not affect the functionality of the interaction between the retaining element and the outer portion of the side wall, as the skilled person would appreciate.

As the slow feeder is assembled from the components shown in FIGS. 8 to 10 (the base, four side wall segments, and the annular rim), the retaining ring is placed over the side wall segments after they have been mounted on the base and before the rim is latched into place. An outer diameter of the rim is greater than an outer diameter of the retaining ring, and so the retaining ring is held captive, encircling the container, once the rim is in position.

To use the slow feeder, the slow-feeder container is filled with fodder or other desired animal feed. The feeding restrictor 4 is then placed on top of the fodder, with the locating elements 28 passing outwardly through the sidewall slots 18. The retaining ring is then lifted so that the spring clips 30 of the feeding restrictor can be coupled, or engaged, with the retaining ring 6. The feeding restrictor and the retaining ring then form a single feeding-restrictor assembly, which is slidable vertically along the slots 18, and which is held captive below the rim 20 of the container.

An animal feeding from the slow feeder removes the fodder through the openings in the feed-covering element of the restrictor. As food is removed, the restrictor assembly moves downwardly, always resting on top of the food. The locating elements move downwardly within the slots. If the animal removes more food from one side of the container than another, the restrictor may tend to tilt, but it is prevented from tilting excessively by abutment of the retaining element against outer surfaces of the side wall of the container, on opposite sides of the container.

After the animal has eaten the food, and it is required to refill the slow feeder, the feeding restrictor is uncoupled from the retaining ring by unfastening the spring clips 30, and removed from the container. The retaining ring can be allowed to fall to the bottom of the container, where it rests on the base 8. The container is then refilled with food, the feeding restrictor replaced on top of the food, and the spring clips again coupled to the retaining ring to reassemble the feeding restrictor assembly.

It is desirable that the feeding restrictor assembly is sufficiently heavy, or has sufficient mass, to ensure that it rests firmly in place on the food or fodder in the container during use. This assists the animal in eating the food by reducing the risk that the animal may lift the assembly while eating, and by slightly compressing at least upper layers of the food. It is also desirable to be able to replace or change, the feeding restrictor, for at least two reasons. One reason is that it may wear during use, due to contact with the animal's teeth. Another reason is that different restrictor designs may be appropriate for different animals or different types of food.

In order to accommodate these factors, in the slow feeder of the embodiment the retaining ring is of a relatively thick gauge of metal wire, and has a mass of between 1.5 and 2 kg. The feeding restrictor is relatively less massive, having a mass of between 0.5 and 0.75 kg. The total weight of the feeding restrictor assembly is therefore between 2.0 and 2.75 kg.

The relatively light weight of the feeding restrictor portion of the assembly makes it easier for replacement feeding restrictors to be manufactured, delivered from a manufacturer to a user, and then to be stored and used by an end-user of the slow feeder.

The rim 20 of the slow feeder, and preferably also the feeding restrictor 6, are of a light colour, preferably pale grey or white, so as to reflect more than 50% of the incident visible light. It is found that this encourages animals, and in particular horses, to eat calmly from the feeder. Other components of the feeder may be of any colour, but are preferably also of light colour.

Figure 12:
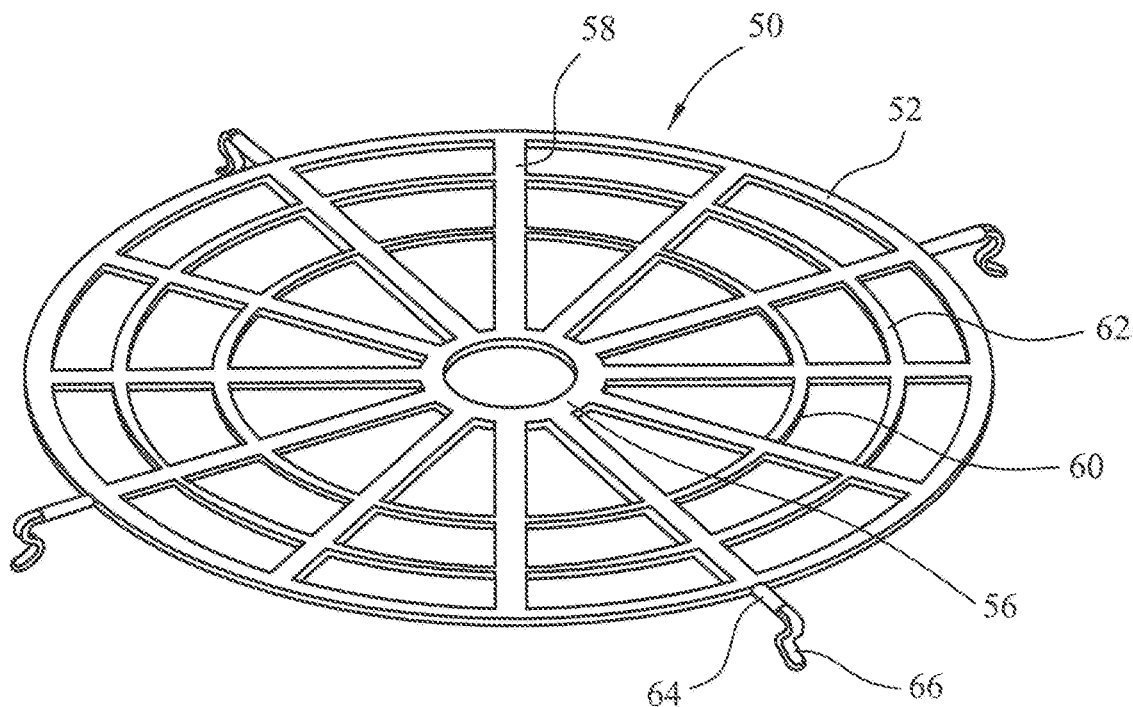
FIG. 12 is a perspective view from above of a feeding restrictor according to a second embodiment of the invention.
Figure 13:
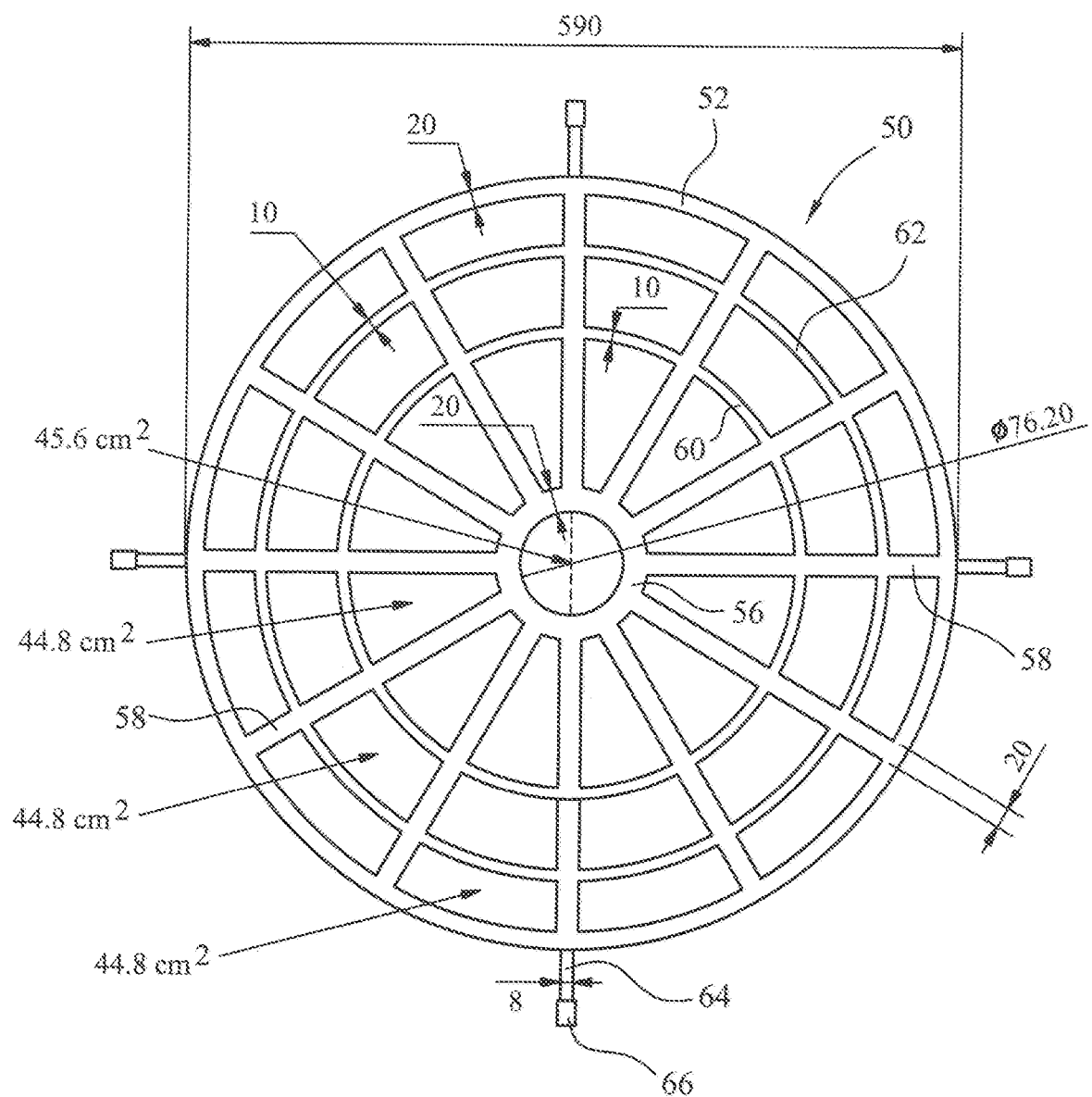
FIGS. 13 and 14 are top and side views of the feeding restrictor of FIG. 12.
Figure 14:
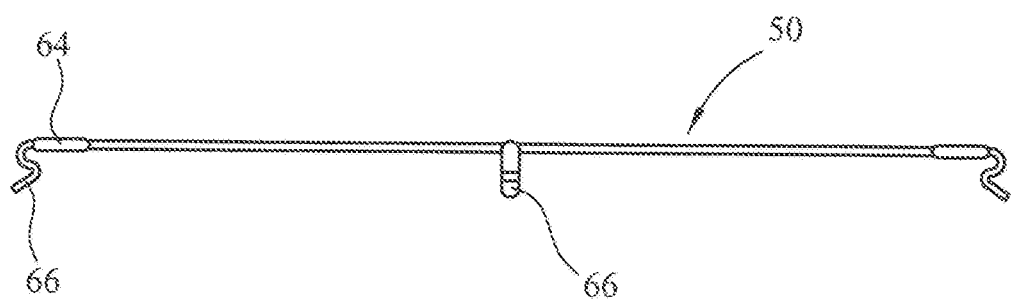

The inventors have investigated the optimum design for a feeding restrictor for a slow feeder. The feeding restrictor described above embodies some of the resulting aspects of the invention, and further aspects are exemplified a second embodiment of a feeding restrictor, illustrated in FIGS. 12 to 14. The feeding restrictor 50 of FIGS. 12 to 14 is usable in the slow feeder of FIGS. 1 to 10, simply by removing the feeding restrictor 4 described above and clipping the feeding restrictor 50 in to place within the retaining ring 6.

The feeding restrictor 50 is moulded from a robust plastics material, such as POM (polyoxymethylene plastic). A central feed-covering element of the feeding restrictor is flat, or planar, of 3 mm thickness. It has a circular periphery formed as an outer circular plastics strut, or beam, 52 of width 15 mm and having the same outer diameter as for the feeding restrictor of the first embodiment, so as to fit within the food container. Within the circular periphery, the feed-covering element has openings defined between struts of the plastics material, as follows. At the centre of the feed-covering element, a central circular opening of area 45.6 $cm^2$ is surrounded by an inner circular strut 56 of width 20 mm. The inner and outer circular struts are linked by twelve equally-spaced radial struts 58 of width 20 mm, and between the inner and outer circular struts are formed first and second intermediate circular struts 60, 62 of width 10 mm, at different intermediate diameters. Three rings of openings are therefore defined between the inner and outer circular struts as follows. Between the inner circular strut and the first intermediate circular strut, twelve openings are defined (between the radial struts). Between the first intermediate circular strut and the second intermediate circular strut, twelve openings are defined. And between the second intermediate circular strut and the outer circular strut, twelve openings are defined. All of these openings are of area 44.8 $cm^2$. All of the openings have rounded corners, to avoid trapping food or injuring the animal.

The aspect ratios of the openings, which may be defined as the ratio of the longest lateral dimension of an opening to the shortest lateral dimension of an opening, or the width to the length of an opening, are selected to be between 1 (for the central circular opening) to a maximum of about 3.2 (for the outer ring of openings). In general, the aspect ratios of the openings should be more than 1 or 1.5, and less than 4 or 3.5.

The widths of the struts between the openings are all between 10 and 20 mm. Struts of this width are not only robust, but can be felt by a feeding animal and recognised as not being part of the food. For example, the width of the struts is much greater than the width of pieces of hay. In addition, struts of this width are sufficiently narrow to avoid food being trapped beneath the struts.

Another important parameter is the total area of the openings in the feed-covering element as a fraction of the total area of the feed-covering element. This ratio is advantageously between 50% and 60%.

The areas and aspect ratios of the openings, and the ratio of the area of the openings to the total area, are advantageously selected as described above in order effectively to restrict the rate at which an animal can feed, without obstructing feeding or frustrating the animal, while avoiding trapping food beneath the feeding restrictor.

As shown in FIGS. 12 to 14, four locating elements 64 extend outwardly from the feed-covering element, terminating in spring clips 66, for in use extending through the slots in the side wall of the slow feeder and engaging with the retaining ring.

In alternative embodiments, the skilled person would appreciate that various aspects of the embodiments described above could be varied while remaining within the scope of the invention. For example, the form of the retaining element and the coupling between the feeding restrictor and the retaining element may be varied while keeping the feature that the feeding restrictor is removable from the slow feeder separately from the retaining ring (or retaining element), or while the retaining ring or element remains captive on the feeder.

FIGS. 15 to 19 illustrate some such alternative structures.

Figure 15:
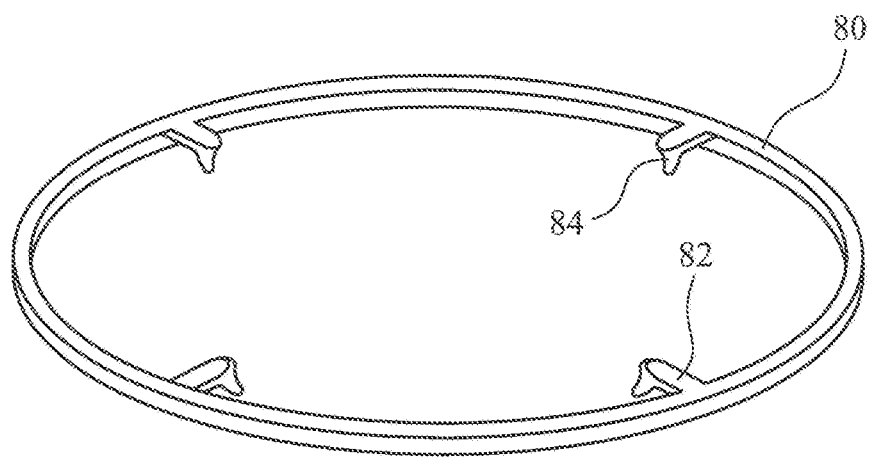
FIGS. 15, 16 and 20 are perspective views of further retaining elements embodying the invention.
Figure 17:
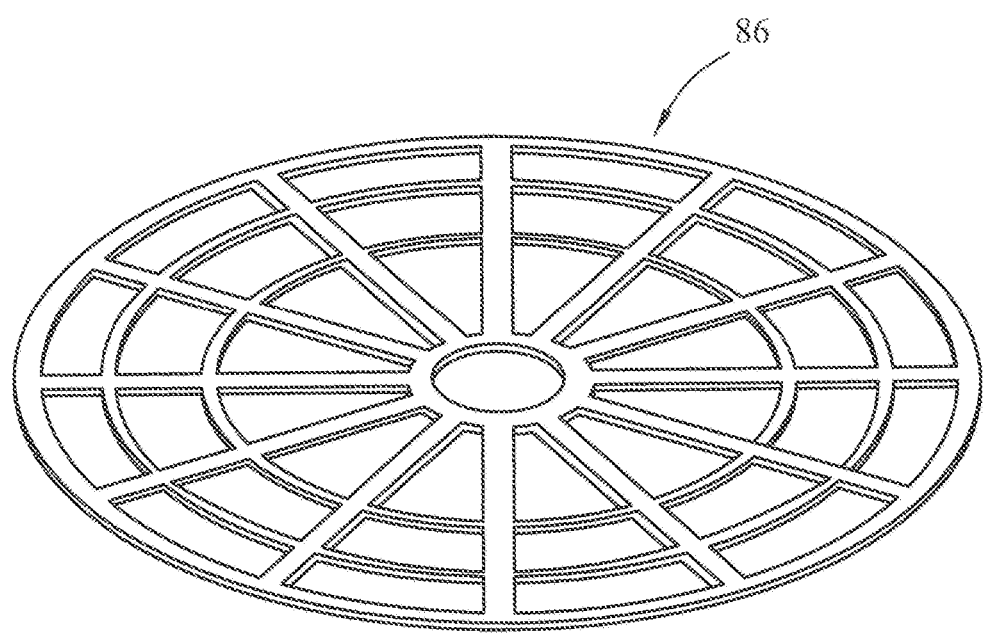
FIG. 17 is a perspective view of a feeding restrictor according to the embodiments of FIGS. 15, 16 and 20.

FIG. 15 shows a retaining ring 80, in which locating elements 82 extend inwardly from the ring, through the slots in the slow feeder, terminating in spring clips 84. Such a retaining ring can be placed over the food container during assembly of the slow feeder, in the same way as described above in relation to the first embodiment, and can couple conveniently to a feeding restrictor 86 as shown in FIG. 17. The feeding restrictor then requires no extending locating elements and its outermost portion is the circumferential edge of the feed-covering element.

Figure 16:
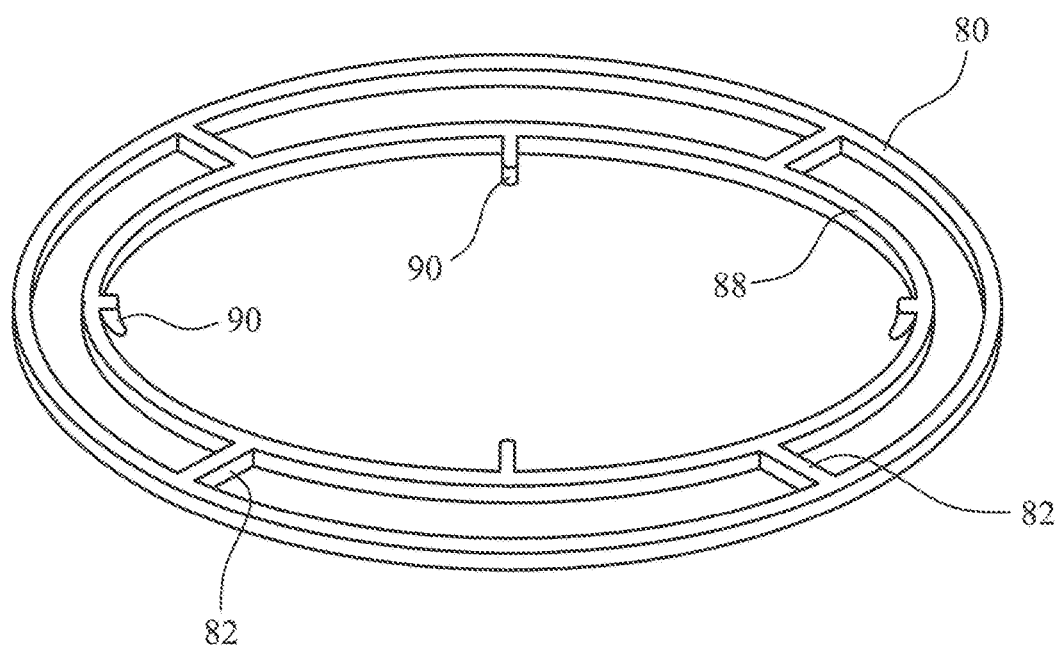

FIG. 16 shows another retaining ring, which is similar to that of FIG. 15 except that it comprises an additional inner retaining ring 88, extending between the locating elements 82, which in use would extend around the inside of the side wall of the slow feeder container. Smaller spring clips 90 mounted on the inner ring would then engage with a feeding restrictor as shown in FIG. 17.

Figure 20:
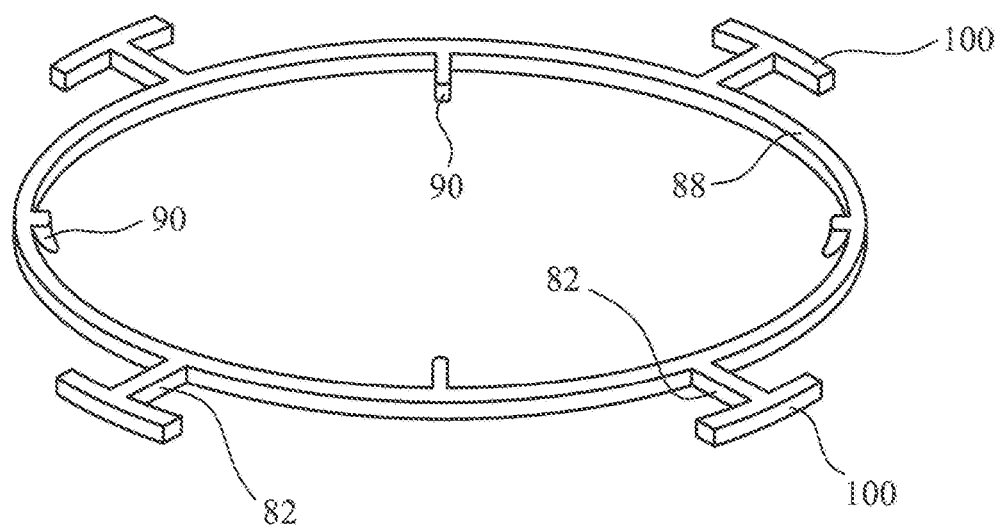

Using this structure, it is possible to change the structure of the ring outside the slow-feeder container, to take the form of ring segments 100 as shown in FIG. 20, rather than an entire ring.

Figure 18:
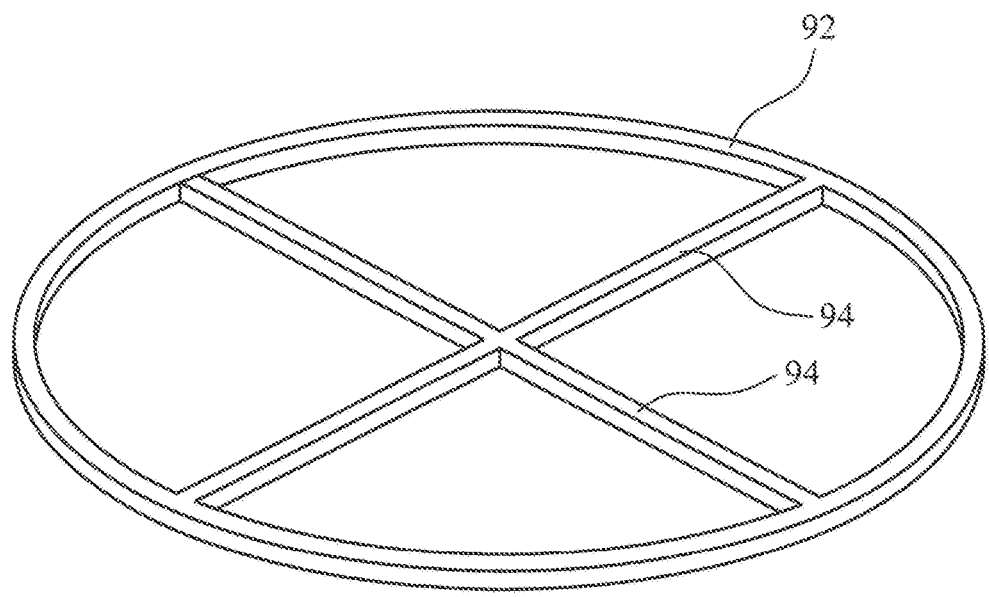
FIG. 18 is a perspective view of a further retaining element embodying the invention.
Figure 19:
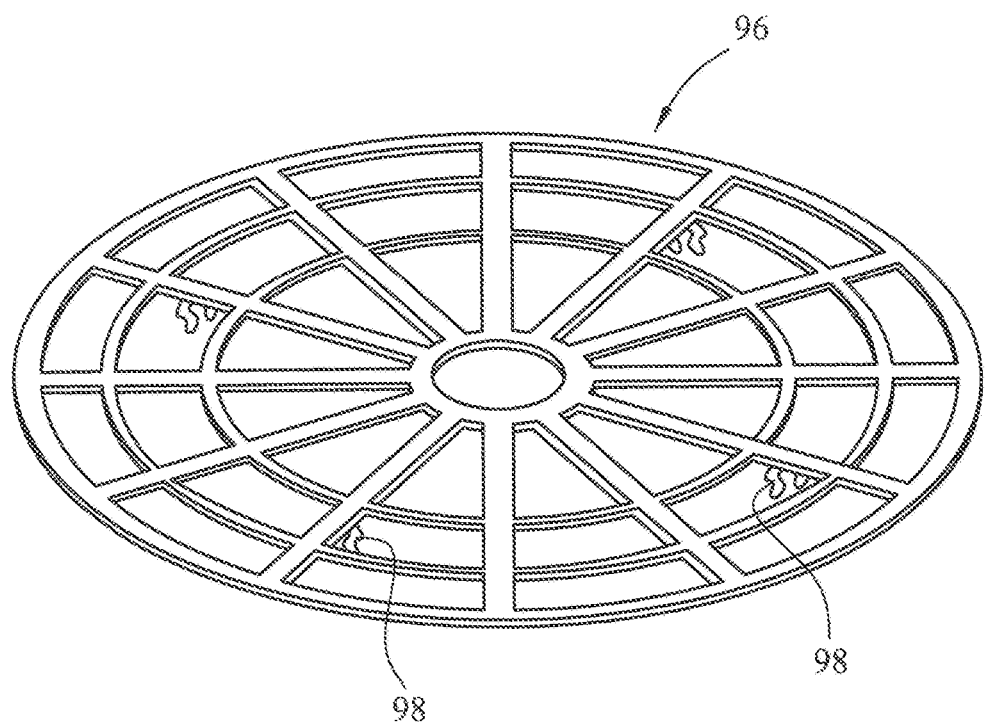
FIG. 19 is a perspective view of a feeding restrictor according to the embodiment of FIG. 18.

FIG. 18 shows another retaining ring 92, in which the locating elements take the form of spokes 94 extending across the diameter of the retaining ring. The outer ends of the spokes, near the ring, are held within the slots in the side wall of the slow feeder. A feeding restrictor 96 suitable for use with such a retaining ring is shown in FIG. 19, and comprises spring clips 98 on a lower surface of the feeding restrictor which are releasably couplable to the spokes 94. In this embodiment, the feeding restrictor is advantageously supported by the spokes.

The invention claimed is:

1. A slow feeder comprising;
    a container for, in use, containing food for an animal, the container having a side wall through which a slot is defined;
    a feeding restrictor for, in use, resting on top of the food; and
    a retaining element which is movably engageable with an outer portion of the container;
    in which a portion of either the feeding restrictor or the retaining element extends through the slot, and in which the feeding restrictor is removably couplable to the retaining element.

2. A slow feeder according to claim 1, in which the feeding restrictor is couplable to the retaining element by means of a fastener located outside the container.

3. A slow feeder according to claim 1, in which the feeding restrictor is couplable to the retaining element by changing a configuration of the retaining element.

4. A slow feeder according to claim 1, in which the feeding restrictor is couplable to the retaining element by means of a fastener located inside the container.

5. A slow feeder according to claim 1, in which the feeding restrictor is couplable to the retaining element by means of a fastener located within the slot.

6. A slow feeder according to claim 1, in which the retaining element encircles the container, preferably comprising a ring of a shape corresponding to an outer shape of the container.

7. A slow feeder according to claim 1, in which the slot is one of a plurality of slots defined through the side wall of the container, and the feeding restrictor is, in use, coupled to the retaining element at each slot.

8. A slow feeder according to claim 7, in which the slots are spaced around the container, preferably being evenly spaced around the container.

9. A slow feeder according to claim 1, in which, when coupled together, the feeding restrictor and the retaining element form an assembly which comprises a locating element extending through the slot.

10. A slow feeder according to claim 1, in which when the feeding restrictor is uncoupled from the retaining element, the feeding restrictor can be removed from the container.

11. A slow feeder according to claim 1, in which when the feeding restrictor is uncoupled from the retaining element, the retaining element cannot be removed from the container.

12. A slow feeder according to claim 1, in which the feeding restrictor is light coloured, preferably white.

13. A slow feeder according to claim 1, in which an upper edge or rim of the container side wall is light coloured, preferably white.

14. A slow feeder according to claim 1, in which the openings are defined through the feeding restrictor through which the animal can access the food, at least 80% of the openings, and preferably all of the openings, being between 35 $cm^2$ and 50 $cm^2$ in area, and preferably between 40 $cm^2$ and 47 $cm^2$.

15. A slow feeder according to claim 14, in which the openings comprise between 50% and 60% of the total area of the feeding restrictor.

16. A slow feeder according to claim 14, in which the feeding restrictor is circular, and the openings comprise a central opening and three concentric circular rows of openings.

17. A method for feeding food to an animal, comprising the steps of;
- providing a container having a side wall through which a slot is defined, between upper and lower slot ends;
- placing food in the container;
- placing a feeding restrictor on top of the food, and coupling the feeding restrictor to a retaining element movably engageable with an outer portion of the container, so that a portion of either the feeding restrictor or the retaining element extends through the slot;
- allowing the animal to feed, through the restrictor, such that the feeding restrictor and the retaining element move downwards, along the slot, as the food is eaten; and
- uncoupling the feeding restrictor from the retaining element to allow further food to be placed in the container.

18. A method according to claim 17, in which the step of coupling the feeding restrictor to the retaining element includes operating a fastening means.

* * * * *